(12) United States Patent
Loughran

(10) Patent No.: US 7,231,198 B2
(45) Date of Patent: Jun. 12, 2007

(54) CONTEXT-DEPENDENT OPERATION OF COMPUTER DEVICES

(75) Inventor: Stephen A. Loughran, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 378 days.

(21) Appl. No.: 10/296,698

(22) PCT Filed: Mar. 28, 2002

(86) PCT No.: PCT/GB02/01469

§ 371 (c)(1),
(2), (4) Date: Nov. 27, 2002

(87) PCT Pub. No.: WO02/079961

PCT Pub. Date: Oct. 10, 2002

(65) Prior Publication Data

US 2003/0134632 A1    Jul. 17, 2003

(30) Foreign Application Priority Data

Mar. 28, 2001  (GB) ................................ 0107790.8

(51) Int. Cl.
*H04B 1/16* (2006.01)
(52) U.S. Cl. .................. 455/343.2; 455/343.1; 455/343.4; 455/574; 713/320
(58) Field of Classification Search ........ 455/418–420, 455/557, 456.1, 556.1–556.2, 573, 574, 522, 455/343.1, 343.2, 343.4; 713/320–324
See application file for complete search history.

(56) References Cited

U.S. PATENT DOCUMENTS 5,625,882 A * 4/1997 Vook et al. ................ 340/7.34
5,630,148 A    5/1997 Norris
5,682,273 A   10/1997 Hetzler
5,790,875 A *  8/1998 Andersin et al. ........... 713/320
5,944,829 A *  8/1999 Shimoda ..................... 713/324
5,958,058 A    9/1999 Barrus ........................ 713/320

(Continued)

FOREIGN PATENT DOCUMENTS

| EP | 0990977 A1 | 4/2000 |
| EP | 1 115 054 A2 | 7/2001 |
| WO | WO 93/07558 | 4/1993 |

OTHER PUBLICATIONS

Phoenix Technologies, http://www.phoenix.com/en/customer+services/bios+support/ applications/powerpanel+fa
Symantec Mobile Essentials 2.5, Product Specifications, www.symantec.com/ mobileesentials.

*Primary Examiner*—Charles Appiah
*Assistant Examiner*—Anthony S. Addy

(57) ABSTRACT

A computing device such as a notebook computer comprises a processor and one or more power sources. A plurality of operational states are defined, each with a set of device operation choices for settings (such as power management or configuration) appropriate to that operational state. The processor is adapted to determine a present operational state. The present operational state is not defined solely by the active power source—it may be defined in part by the location of the mobile computing device, its network status, the active power source, the state of battery charge, or by a model of user behavior. The processor is further adapted to implement the device operation choices for the present operational state.

56 Claims, 7 Drawing Sheets

U.S. PATENT DOCUMENTS

| | | | |
|---|---|---|---|
| 5,978,923 A | 11/1999 | Kou | 713/323 |
| 6,006,335 A | 12/1999 | Choi et al. | 713/310 |
| 6,044,473 A * | 3/2000 | Kim | 713/320 |
| 6,078,826 A * | 6/2000 | Croft et al. | 455/574 |
| 6,185,677 B1 | 2/2001 | Nijhawan | |
| 6,317,593 B1 * | 11/2001 | Vossler | 455/414.1 |
| 6,418,309 B1 * | 7/2002 | Moon et al. | 455/418 |
| 6,427,120 B1 * | 7/2002 | Garin et al. | 701/213 |
| 6,453,182 B1 * | 9/2002 | Sprigg et al. | 455/574 |
| 6,704,561 B2 * | 3/2004 | Kuroiwa | 455/343.1 |
| 6,804,541 B1 * | 10/2004 | Muramatsu et al. | 455/573 |
| 6,928,300 B1 * | 8/2005 | Skinner et al. | 455/556.2 |
| 2003/0025689 A1 * | 2/2003 | Kim | 345/211 |

\* cited by examiner

CONTEXT-DEPENDENT OPERATION OF COMPUTER DEVICES

FIELD OF INVENTION

The present invention relates to computing devices adapted to operate in a plurality of contexts.

DESCRIPTION OF PRIOR ART

Computing devices, particularly mobile (i.e., portable) computing devices, and especially notebook computers, are typically used in different ways in different user contexts. This is particularly true when notebook computers are used as replacement for traditional desktop computers. These contexts are typically associated in some way with location (user's normal desk, home, travel, meeting rooms . . . ). Currently, notebook computers are predominantly optimised for use during travel. It is however desirable to address the different usage of a notebook computer in different contexts so as to optimise the effectiveness of the mobile computer for the user. For example, Microsoft Windows 2000 provides a range of user-selectable power options, providing monitor, hard disk and standby options for mains and battery operation.

Symantec Mobile Essentials (a product of Symantec Corporation, described at http://www.symantec.com/me/) is an application which does provide some adaptation to location. The user can provide the application with a number of location possibilities, together with network options associated with each of these location possibilities for that operating system and for other applications: when the user is in a particular location, the user can then advise the application of that location, and the operating system and the other applications provided with the appropriate network options.

It is known to provide a notebook computer with access to location information (for example, by providing it with a GPS receiver or a cellphone), generally for purposes particularly associated with location (such as navigation).

It would be desirable to find other approaches to further optimise the effectiveness of a mobile computer for a user who operates the computer in different contexts.

SUMMARY OF INVENTION

Accordingly, there is provided a computing device comprising a processor and one or more power sources and having a plurality of operational states each with a set of device operation settings appropriate to that operational state;

wherein the processor is adapted to determine a present operational state not defined solely by the nature or state of the active power source, and is further adapted to implement the device operation choices for the present operational state.

It is known to provide some types of power management tool in a notebook computer device. The simplest example, generally provided, is to provide different power management dependent on power source (specifically as to whether the power source is the mains or a battery). An example of a more sophisticated power management tool is Phoenix PowerPanel 3.0, a product of Phoenix Technologies Ltd. used in the Sony Vaio notebook computer, which adjusts system power management policies based on the currently active application. Phoenix PowerPanel (which is further described at http://www.phoenix.com/platform/powerpanel.html) provides for different application types a power profile consisting of power management settings optimised for the application type. The user also has the option of selecting which power profile is to be used (rather than relying on autodetection by PowerPanel of the application type of the active application).

In the present invention, however, it is realised that the overall operational state—or user context—may be more significant in determining the preferred power management behaviour than the applications concerned. It may be acceptable for users for a specific application to perform optimally but with high power demand in some contexts, but with slower response but greater power efficiency in other contexts. The context, or operational state, is definable with respect to a particular set of user needs or behaviours. These may be associated with a particular location, but also may be associated with a particular type of behaviour that the user may wish to adopt in a number of locations. While it will generally be the case that only one context will be appropriate to a particular location (where "location" should be considered exactly, rather than more generally—it would be logical to expect more than one different context in the user's normal working environment (own desk, meeting room etc.), it may also be possible in some cases for more than one context to be used in a particular location (influenced by, for example, presence, absence or nature of a network connection).

The present operational state is determined by one or more inputs directly or indirectly relevant to the power management requirements of the device—typically, by a combination of these inputs combined according to a rule. Inputs may include present location of the device (obtained by GPS, cellphone, or other means), current network address, information provided by other networked devices, the operative power source, the current state of charge of the battery or even a model of user behaviour based upon prior usage of the device. The type of power source available is an example of a general type of input—the presence or absence of an optionally usable resource (presence or absence of a network connection, or network connection by cellphone, might be another example). Preferably, the presence or absence of a particular specified resource will not itself be sufficient to define an operational state—at least, that there will be one or more operational states not defined simply by the presence or absence of specific resources. It should be noted that operational states are different states of operation by the user—an inactive or standby state is not an operational state for these purposes.

In one aspect, the invention therefore provides a portable computing device, comprising a processor and one or more optionally usable resources and having a plurality of operational states each with a set of device operation settings appropriate to that operational state; wherein the processor is adapted to determine a present operational state not defined solely by whether or not any one of the optionally usable resources is in use, and is further adapted to implement the device operation choices for the present operational state.

User contexts may be defined for meetings (to optimise performance in particular locations), for travel (to optimise power management away from specified home or office locations) or for home use. Users may themselves define or modify user contexts, or may override the determined user contexts where they wish to do so.

In a further aspect, the invention provides a data structure for use in a mobile computing device, the data structure comprising: a definition of a plurality of operational states each with a set of device operation settings appropriate to that operational state, executable code comprising a process for determining a present operational state not defined solely by the nature or state of an active power source of a mobile computing device; and executable code comprising a process for implementing the device operation choices for the present operational state.

In a still further aspect, the invention provides a method of power management in a computing device having one or more selectively usable resources, the method comprising: defining a plurality of operational states each with a set of device operation choices for power management appropriate to that operational state; determining a present operational state, where the present operational state is not defined solely by whether a specific one of the one or more selectable resources is in use; and implementing the device operation choices for the present operational state.

DESCRIPTION OF FIGURES

Embodiments of the invention will be described below, by way of example, with reference to the accompanying drawings, of which.

SPECIFIC EMBODIMENTS OF THE INVENTION

Figure 1:
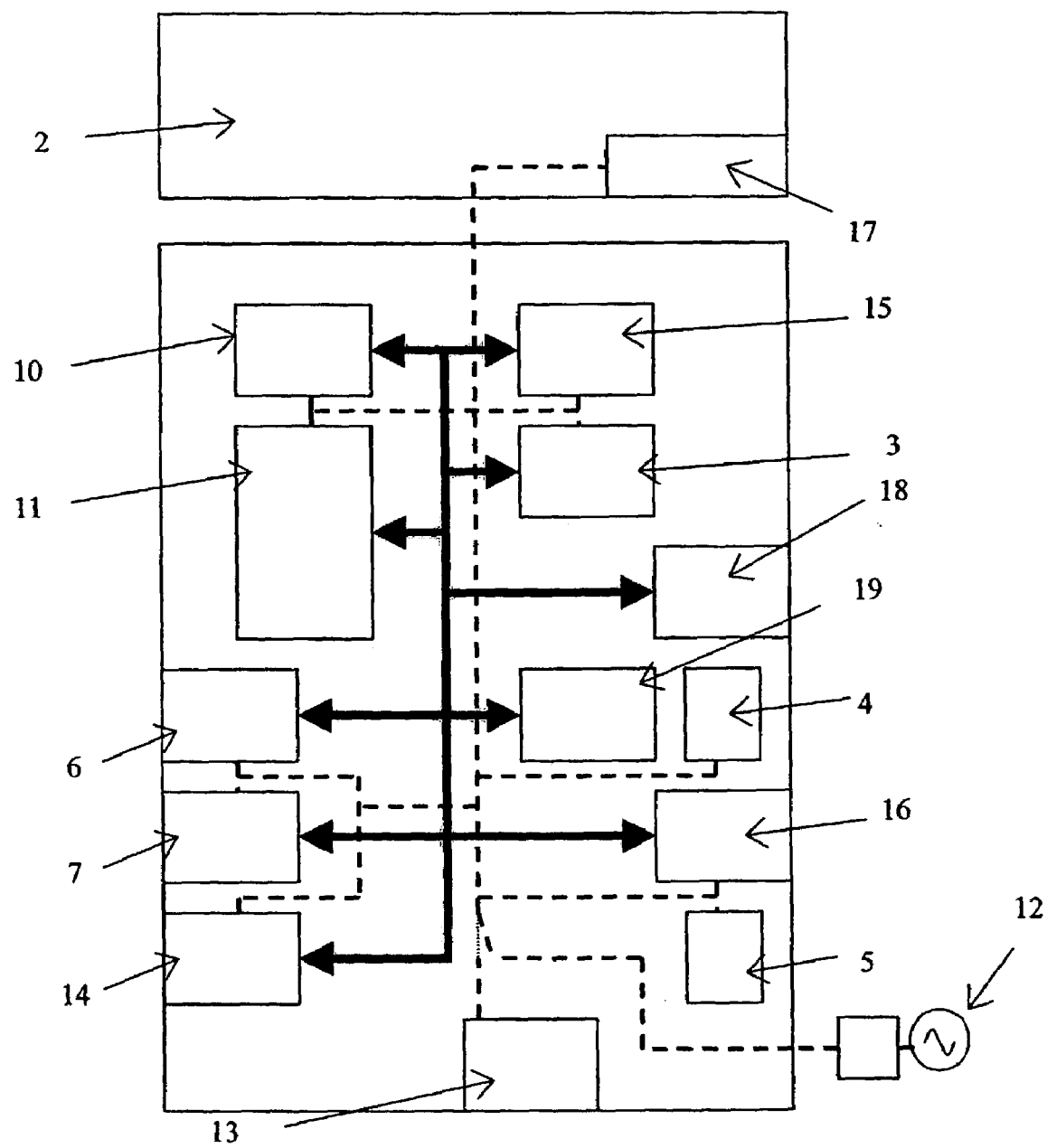
FIG. 1 is a schematic view of a notebook computer adapted for use with a first embodiment of the invention.

FIG. 1 is a schematic view of a notebook computer illustrating components of relevance to the present invention. As will be appreciated by those skilled in the art, the present invention can be applied to any conventional architecture of notebook computer.

Notebook computer 1 comprises a CPU 10 and a memory 11 (shown here for convenience as one schematic element, but which typically consists of a RAM main memory, a ROM holding BIOS and other code required at startup, and a RAM cache), which holds the operating system of the computer and also applications available for execution by the computer. The notebook computer 1 is adapted to be powered by a battery 13 for at least a part of the time, so power conservation is a relevant concern. The remainder of the time, the notebook computer may be powered by the mains 12 (alternatively or additionally, the mains connection will generally be used to power the battery 13).

Components of the notebook computer 1 which consume significant power are shown in FIG. 1. CPU 10 consumes significant power in normal use, and may consume more power when applications make heavy processing demands. The display 2 also consumes significant power—the screen backlight 17 is a major consumer of power, and power will also be consumed by the graphics adapter 15 providing the signal for the display 2. Disk drives (such as hard disk drive 4 and floppy disk drive 5, controlled through disk drive controller 16) also consume significant power. Other power consumers may be the various input/output devices (keyboard, mouse etc.) 18 associated or integrated with the notebook computer, and a network adapter 14 to allow the notebook computer 1 to connected to networks. Shown for completeness as normal system elements are serial interface 6 (through which a modem may be connected—if, as normal, this is internal to the computer this may be a significant consumer of power) and a parallel interface 7.

Also shown in FIG. 1 are power management switches 19. These typically include a lid switch, which turns off the display and (typically) moves the notebook computer 1 to a sleep state, and a user switch, normally used to turn on the computer or to cause the computer to enter a suspend state. As will be described further below, the functionality of these switches can be varied in accordance with a sophisticated power management strategy.

Also shown in FIG. 1 is a location detection element 3. This location detection element may be one of a variety of alternative possibilities, a number of which are described further below. As will also be described below, in embodiments of the invention appropriate location or context information may be provided without use of a discrete location detection element, or the location detection may be provided by another system component (such as modem or network adapter 14 and associated software).

In aspects of the present invention, there is first a determination that the notebook computer is in one of a number of contexts or operational states in which power management requirements differ. These contexts are not determined solely by whether power is provided at that moment by battery 13 or mains power 12—it is conventional for different power management strategies to be used dependent on the active power source. Once this determination has been made, the notebook computer changes its power management policy in accordance with the context.

"Context", in respect of the present invention, is not determined either by the power source active at the time (as in conventional notebook computers) or by the primary application active at the time (as in Phoenix PowerPanel 3.0). The present inventor has determined that typical users of notebook computers have patterns of use which involve distinct operational modes. Such patterns are shown in Table 1 below.

TABLE 1

Patterns of use for notebook computers

| Location | Power | Networking | Tasks |
| --- | --- | --- | --- |
| Desktop | AC | LAN | Productivity, E-mail |
| Meeting | DC | None | E-mail, attachments |
| Home | DC/AC | Modem | E-mail, productivity, play |
| Travel | DC | Modem/LAN | E-mail, productivity |

These operational modes are examples of the "contexts" of the present invention and will be used for illustrative purposes in embodiments shown below. However it should be noted that the present invention is not limited to use for the specific operational modes indicated in Table 1, or to operational modes of this specific type. "Contexts" could, for example, be user-defined, based on behaviours specific to an individual user (and could, for example, be constructed through a setup wizard through a series of questions answered by the user to enable a context to be defined and applications and strategies associated with the context to be identified).

Options for assessment of the context in which the computer is being used will now be discussed. The "contexts" identified in Table 1 can all be identified with distinct locations: typically, "Desk" will correspond to the user's normal workspace or a hot desk, "Meeting" will correspond to other environments within the user's normal place of work, "Home" will correspond to the user's home or a small set of "home" locations, and "Travel" will correspond to everywhere else. Absolute or relative detection of location may itself be sufficient to define a context—this may be combined with other context-relevant information. Different location detection mechanisms which can be employed in embodiments of the invention will now be discussed. This is followed by discussion of other mechanisms which are not strictly identifiers of location, but which also detect (or assist in detection of) context.

Figure 2:
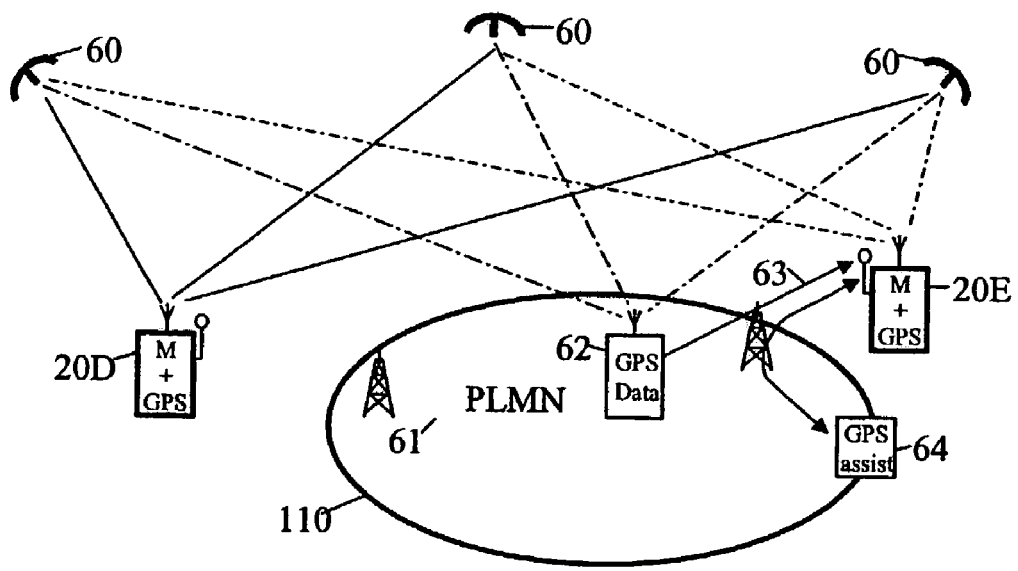
FIG. 2 is a schematic diagram of methods for location detection using the Global Positioning System (GPS) appropriate for use with embodiments of the invention.

A first example of an appropriate location detection element 3 is a global positioning system (GPS) receiver—as indicated below, although a measure of pure "location" this may not be the best approach to use for the purpose of determining context, but is described as a first illustrative example. FIG. 2 depicts several forms of GPS location-determining system. On the left-hand side of FIG. 2, a notebook computer 20D is provided with a standard GPS module and is capable of determining its location by picking up signals from satellites 60. The notebook computer 20D can then supply this location as an input for determining its context, and appropriate power-saving behaviour.

The right-hand side of FIG. 2 depicts, in relation to a notebook computer 20E which is connected to the GSM PLMN (Public Land Mobile Network), two ways in which assistance can be provided to the entity in deriving location from GPS satellites. Firstly, the PLMN 110 can be provided with fixed GPS receivers 62 that each continuously keep track of the satellites 60 visible from the receiver and pass information in messages 63 to local mobile computers 20E as to where to look for these satellites and estimated signal arrival times; this enables the mobile computers 20E substantially to reduce acquisition time for the satellites and increase accuracy of measurement (see "Geolocation Technology Pinpoints Wireless 911 calls within 15 Feet" 1 Jul. 1999 Lucent Technologies, Bell Labs). Secondly, as an alternative enhancement, the processing load on the mobile computer 20E can be reduced and encoded jitter removed using the services of network entity 64 (in or accessible through PLMN 110).

Once the mobile unit 20E has determined its location, it can use this information to determine a context as further discussed below.

GPS is a powerful method for producing accurate location information at any geographical position, but does have disadvantages. One is that it is relatively ineffective in large industrial buildings (and in aeroplanes). As with all of the location-detection methods described here, it is advantageous to use GPS as one of several information inputs, rather than as a sole input, in determining context. Although GPS provides a pure measure of "location", it may in practice be one of the less useful ways available to provide location information. It should be noted that location information used in embodiments of the invention need not be in terms of longitude and latitude as provided by GPS, and that in most cases other forms of location information may be more useful.

Figure 3:
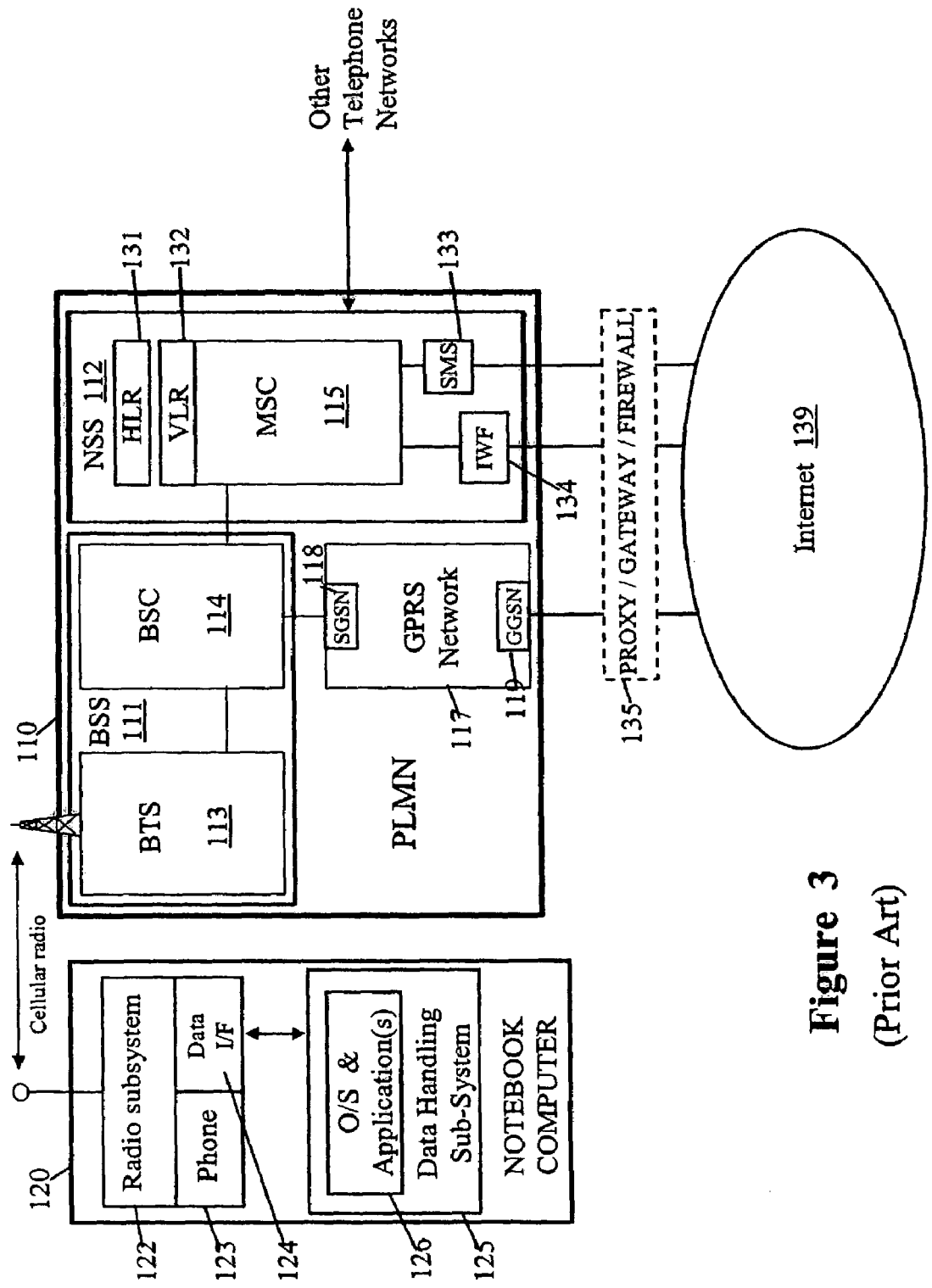
FIG. 3 is a schematic diagram of methods for location detection using a cellphone network appropriate for use with embodiments of the invention.

An alternative, and generally more practical, way to provide effective location information is by a cellphone network itself. By way of example, FIG. 3 shows one form of known communication infrastructure for mobile users providing both telephony and data-bearer services. In this example, a mobile entity (such as a notebook computer) 120, provided with a radio subsystem 122 and a phone subsystem 123, communicates with the fixed infrastructure of GSM PLMN (Public Land Mobile Network) 110 to provide basic voice telephony services. In addition, the mobile entity 120 includes a data-handling subsystem 125 interworking, via data interface 124, with the radio subsystem 122 for the transmission and reception of data over a data-capable bearer service provided by the PLMN; the data-capable bearer service enables the mobile entity 120 to communication with a service system 140 connected to the public Internet 139. The data handling subsystem 125 supports an operating environment 126 in which applications run, the operating environment including an appropriate communications stack (in the case of a notebook computer, this may be the normal operating environment of the computer).

More particularly, the fixed infrastructure 110 of the GSM PLMN comprises one or more Base Station Subsystems (BSS) 111 and a Network and Switching Subsystem NSS 112. Each BSS 111 comprises a Base Station Controller (BSC) 114 controlling multiple Base Transceiver Stations (BTS) 113 each associated with a respective "cell" of the radio network. When active, the radio subsystem 122 of the mobile entity 120 communicates via a radio link with the BTS 113 of the cell in which the mobile entity is currently located. As regards the NSS 112, this comprises one or more Mobile Switching Centers (MSC) 115 together with other elements such as Visitor Location Registers 132 and Home Location Register 131.

When the mobile entity 120 is used to make a normal telephone call, a traffic circuit for carrying digitised voice is set up through the relevant BSS 111 to the NSS 112 which is then responsible for routing the call to the target phone (whether in the same PLMN or in another network).

With respect to data transmission to/from the mobile entity 120, in the present example three different data-capable bearer services are depicted though other possibilities exist. A first data-capable bearer service is available in the form of a Circuit Switched Data (CSD) service; in this case a full traffic circuit is used for carrying data and the MSC 115 routes the circuit to an InterWorking Function IWF 134 the precise nature of which depends on what is connected to the other side of the IWF. Thus, IWF could be configured to provide direct access to the public Internet 139 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service (SAS) that passes data carried in signaling channel slots to an SMS unit 133 which can be arranged to provide connectivity to the public Internet 139.

A third data-capable bearer service is provided in the form of GPRS (General Packet Radio Service which enables IP (or X25) packet data to be passed from the data handling system of the mobile entity 120, via the data interface 124, radio subsystem 121 and relevant BSS 111, to a GPRS network 117 of the PLMN 110 (and vice versa). The GPRS network 117 includes a SGSN (Serving GPRS Support Node) 118 interfacing BSC 114 with the network 117, and a GGSN (Gateway GPRS Support Node) interfacing the network 117 with an external network (in this example, the public Internet 139). Full details of GPRS can be found in the ETSI (European Telecommunications Standards Institute) GSM 03.60 specification. Using GPRS, the mobile entity 120 can exchange packet data via the BSS 111 and GPRS network 117 with entities connected to the public Internet 139.

The data connection between the PLMN 110 and the Internet 139 will generally be through a firewall 135 with proxy and/or gateway functionality.

Figure 4:
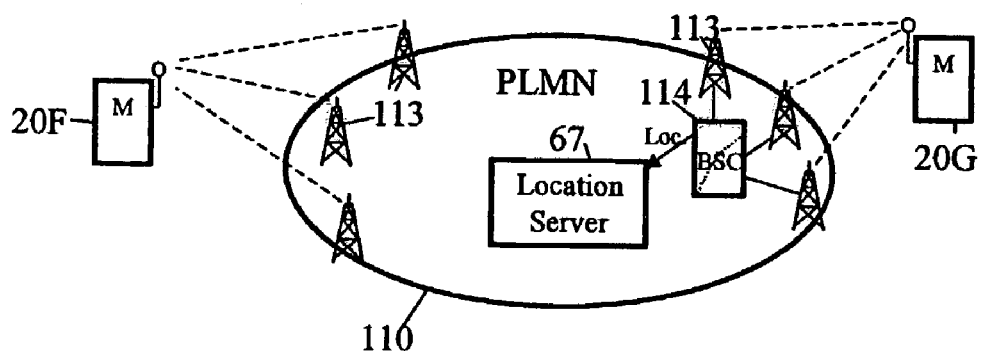
FIG. 4 is a schematic diagram of methods for location detection using a cellular radio infrastructure appropriate for use with embodiments of the invention.

FIG. 4 depicts two general approaches to location determination from signals present in a cellular radio infrastructure. First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 114 and the mobile entity). Beyond current basic cell ID, it is possible to get a more accurate fix by measuring timing and/or directional parameters between the mobile entity and multiple BTSs 113, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

Figure 5:
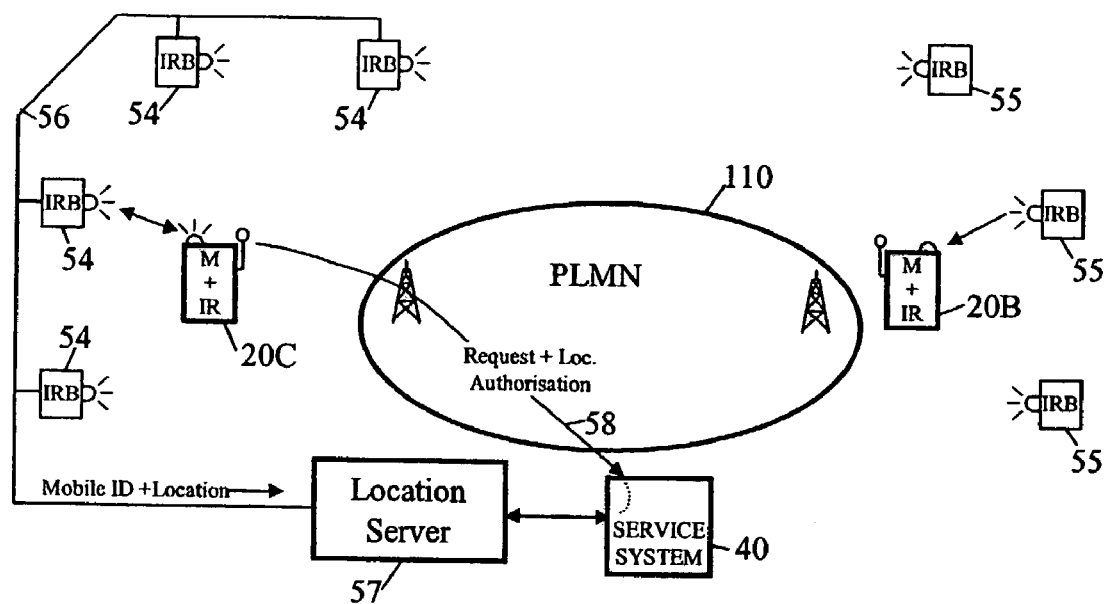
FIG. 5 is a schematic diagram of methods for location detection using short range beacons appropriate for use with embodiments of the invention.

The left-hand half of FIG. 3 depicts the case of location determination being done in the mobile entity 20F by, for example, making Observed Time Difference (OTD) measurements with respect to signals from BTSs 113 and calculating location using a knowledge of BTS locations. The calculation load on mobile entity 20F could be reduce and the need for the mobile to know BTS locations avoided, by having a network entity do some of the work. The right-hand half of FIG. 5 depicts the case of location determination being done in the network, for example, by making Timing Advance measurements for three BTSs 113 and using these measurements to derive location (this derivation typically being done in a unit associated with BSC 114). The resultant location data is passed to a location server 67 from where it can be made available to those authorised to receive it.

Cellphone location information is potentially of comparable accuracy to GPS—however, for most context-setting purposes, knowledge of the active cell may be the most important piece of information. Closely-spaced contexts are most likely to be different work locations—for which a local system may be more effective than a global or multi-geography system such as GPS or a PLMN.

FIG. 5 shows two different location-determining methods both involving the use of local, fixed-position, beacons appropriate for use within a location such as an office building. The beacons are here shown as infra-red beacons IRD through other technologies, such as short-range radio systems (in particular, "Bluetooth" systems) may equally be used—another useful possibility is use of access points to a wireless LAN operating under the IEE802.11 standard. The right hand half of FIG. 5 show a number of independent beacons 55 that continually transmit their individual locations. Mobile entity (in this case a notebook computer) 20B is arranged to pick up the transmissions from a beacon when sufficiently close, thereby establishing its position to the accuracy of its range of reception. This location data can then be used as an input to the context-determining process. A variation on this arrangement is for the beacons 55 to transmit information which whilst not directly location data, can be used to look up such data (for example, the data may be the Internet home page URL of a store housing the beacon 55 concerned, this home page giving the store location—or at least identity, thereby enabling lock-up of location in a directory service).

In the left-hand half of FIG. 3, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to determine its location, it must provide its identity in a service request 58 (here shown as passing through a PLMN—however any appropriate network could be used) and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58.

Another possibility would be for the mobile entity to send a broadcast or multicast message to LAN based beacons 54, with the closest beacon 54 responding with identifying information that could be used as an indicator of location or context. A logical approach would be to send a multicast message to the local subnet, with the search then being broadened if this yielded to replies. Such LAN based "context beacons" could provide context to mobile entities in both wired and wireless LANs without additional hardware cost.

A system of this type is particularly appropriate for use within an office environment: for example, appropriate beacons could be used to identify meeting rooms, and could in themselves indicate that a "meeting" context should be adopted. Clearly, this type of information will only be present where there is an appropriate local network, but where such information is available it is likely to be particularly significant in determining context.

A further piece of information that may be particularly significant in determining context is the operative network address (and configuration) of the notebook computer. Clearly, it may be relevant if the computer is or is not connected to the network, or if the computer is attached through a dialup connection (suggesting home or travel use) rather than through a direct connection to a corporate LAN. However, even within a LAN, the address may be used to identify whether a user is at his normal desk (and in a "Desktop" context) or in a meeting room (and in a "Meeting" context)—typically, any address other than one or two specific "Desktop" addresses would be "Meeting" addresses (or alternatively, meeting room addresses could be determined by interrogation of an address server—this may be most useful in a hotdesking working environment).

A further approach would be to use a predictive assessment of user location or context. Day of week and time of day could be used for this purpose: one logical if simplistic scheme would be to set the weekday daytime context as "Desktop" or "Meeting" (according to LAN connection) and the weekend and weekday night time context as "Home"—unless the time zone was different from the normal time zone, in which case the context would be "Travel". To improve this approach, the system could be adapted to learn (for example, by analysis of usage logs—eg, heavy battery drain on Tuesdays indicating that this day is often spent in travel—consequent behaviour may be to set "Travel" context for Tuesdays but also to optimise battery charge at the end of Monday).

Related to this heuristic approach, actual evidence can be obtained from the state and contents of applications. For example, if a diary application indicates that a meeting is currently scheduled, then this may determine (or suggest, in the absence of other compelling indicators) that the current context should be "Meeting"—likewise, use of full screen display or connection to an external monitor while in a presentation application could be taken as a strong indicator of a "Meeting" context, or possibly a specific "Presentation" context.

Current battery charge level may be another significant factor in determining context—particularly in connection with predictive assessment indicating that the notebook computer is about to enter "Travel" mode. Under such circumstances, and perhaps at any time that charge is sufficiently low, an additional "Charge Optimisation" context could be employed to maximise charge. For example, if the notebook computer was currently operating under mains power but with charge below a certain level, the "Charge Optimisation" mode would be detected rather than the "Desktop" mode, and power saving options implemented until charge reached an acceptable level.

It is entirely possible to combine one or more of these approaches, or to use a rule-based approach to assimilate different inputs to determined context (for example, the presence of a LAN connection may be used to override a GPS reading that would suggest "Travel" and replace it with "Desktop", determining that the presence of a non-dial-up LAN connection here indicates use at a geographically different office location). It should also be possible for the user to override the power management settings detected by the machine (for example, the user may want "Meeting" functionality at a customer site, where location detection would suggest "Travel").

Figure 6:
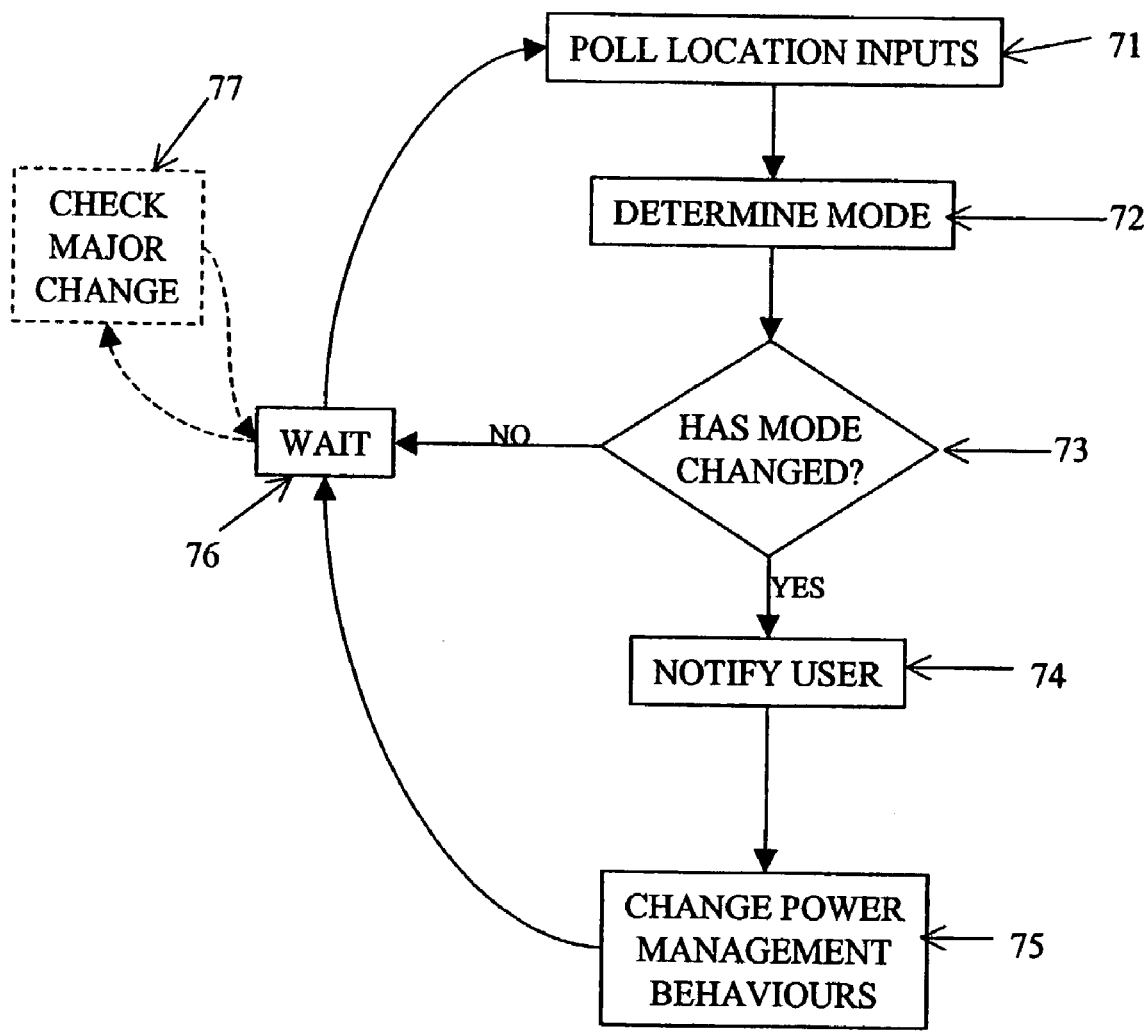
FIG. 6 is a flow diagram shown a power management process according to an embodiment of the invention.

The basic pattern of operation according to one embodiment of the invention is shown in FIG. 6. FIG. 6 shows a flow diagram for a process that can be carried out as a background task under the operating system of the notebook computer.

Figure 7:
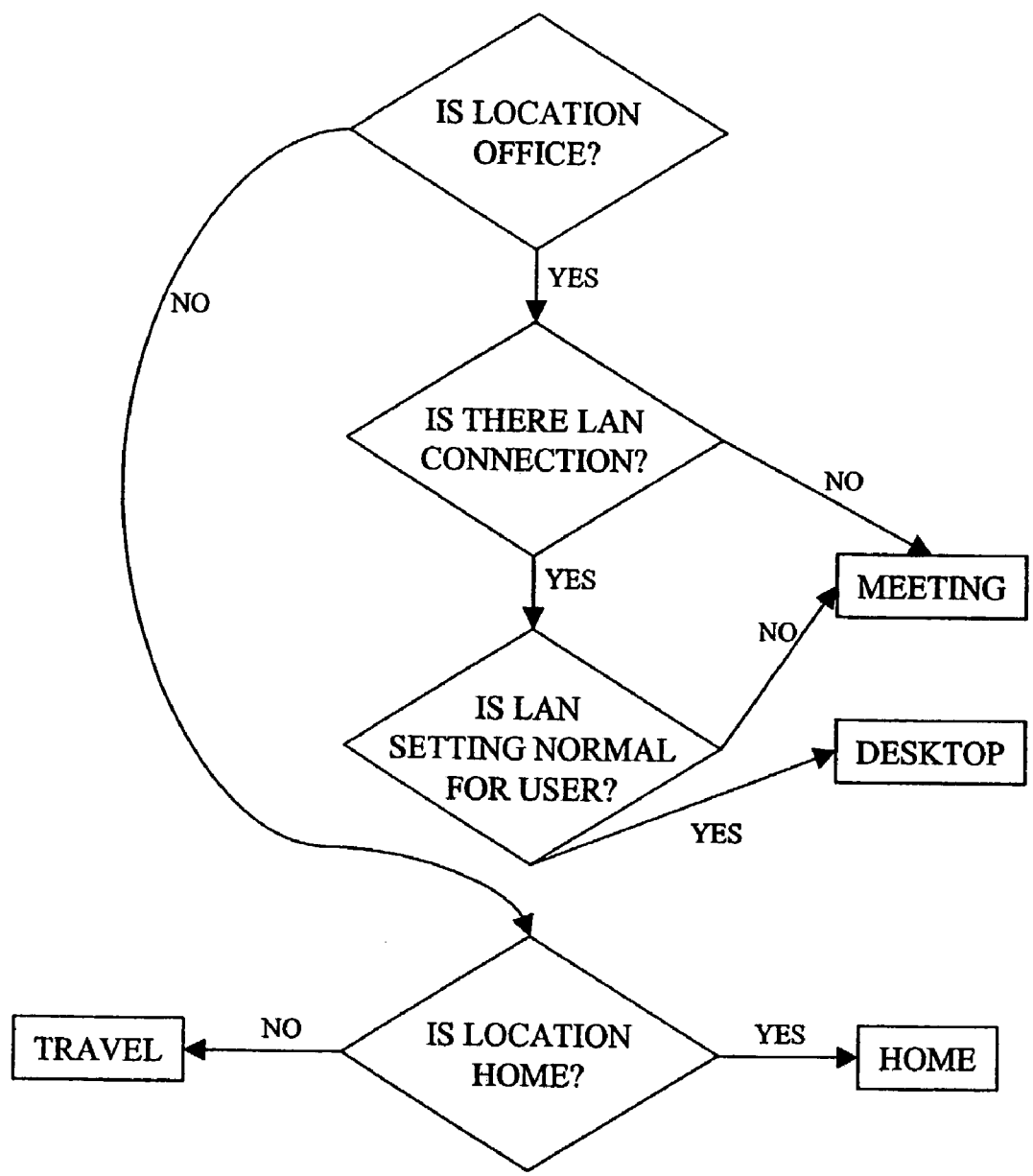
FIG. 7 is a flow diagram showing rule-based context mode selection according to an embodiment of the invention.

In step 71, the process polls the sources of location information—more specifically, the sources of information that are available for use in determining the current context. One such source may be a location detection element 3 (such as a cellphone or GPS receiver), another may be the currently operative power supply, and another may be a heuristically determined rule set calculated from a usage log—essentially, any of the information sources described above (or others) could be used as "context inputs". Such polling may occur at regular intervals (for example, every ten minutes) or could be triggered by a notification from the operating system to an application when a relevant change in state is detected (for example by the battery or network adapter). In step 72, the process determines, according to a set of pre-established rules, a preferred context mode from the different context inputs. A simple rule set could be that shown by flow diagram in FIG. 7, which employs the four separate "contexts" indicated in Table 1 above. In the FIG. 7 example, the process first determines whether "location" is "office"—if so, the preferred mode is set at "Desktop" if the user's normal LAN settings are detected, and is set at "Meeting" otherwise. If "location" is not "office", the preferred mode is set to "Home" if location is found to be "home" (clearly, users will need to indicate at a setup stage how the locations "office" and "home" can be detected—simple presence at either location together with an indication of such presence should be sufficient) and is otherwise set to "Travel".

In step 73, the process determines whether the preferred context mode has changed. If not, the process moves to wait step 76. If the preferred context mode has changed, the process may alert the user in step 74, for example by a screen message (alternatively, power management could be applied without positive notification to the user—logically, the user could determine whether or not such notification was required). Advantageously, the process does not wait for user permission to apply changes to power management, but does wait for a short period of time to allow the user to override proposed changes to power management if changes are not required. It is therefore desirable for such a user alert to allow the user to activate a user screen to the power management process, from which the user can specify a context mode to be applied. This user-determined context may then be retained until the next power down, or until the user puts the process back into a "self-management mode" or for some specified length of time (such as thirty minutes or an hour)—alternatively, the process may be adapted to continue in operation as shown in FIG. 6 even when there is a user-determined context, but instead of changing power management the process could instead merely advise the user that an alternative context was suggested (preferably, such messages would not be produced until after a further significant change in a context input from the point at which the user determined the context—otherwise a stream of clearly unwanted messages would result). Certain contexts may be configured to disable calculation of context, requiring that the user switch out of them manually (this could usefully apply to a "Presentation" context in particular, but may also be helpful for "Travel").

In step 75, the power management behaviours of the notebook computer are changed. Generally, this will involve the application of a power economy mode where this is required, or in Meeting mode, the suppression of certain features to optimise performance of desired features. Advantageously, power management behaviours can be controlled for every significant power consumer—as the CPU 10 is itself a significant consumer of power, it is also desirable to control power management for applications that use significant CPU time. Change of power management behaviours is discussed further below.

In step 76, the process waits before conducting a further polling step. This wait period may be fixed at a period that is small compared to battery life but sufficiently large that the process uses minimal CPU time (for example, five minutes), or alternatively, may be varied dependent on the currently operative context or, more likely, operational state (for example, the period may be longer if the current operational state is standby—in a deep standby state the process will probably be suspended altogether). It is desirable for the process to be able to break out of the wait step 76 more rapidly if significant changes occur—for example, by addition of a wait loop containing a check step 77 in which major system changes (reactivation after standby, change from battery to mains power etc.) can be detected, leading the process directly back to a new polling step 71.

Figure 8A:
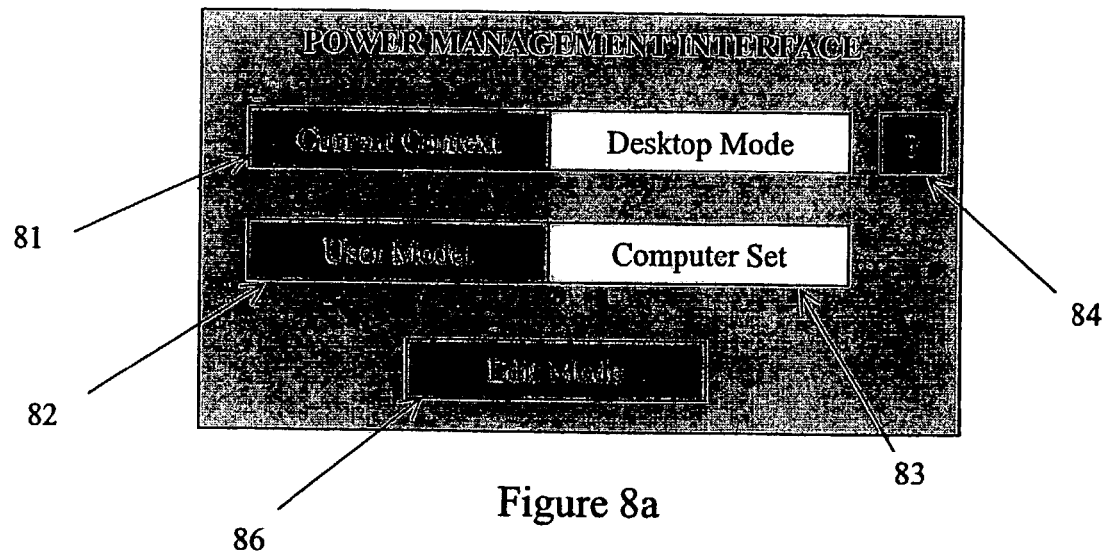
FIGS. 8a and 8b are diagrams of a user interface to a power management process according to an embodiment of the invention.
Figure 8B:
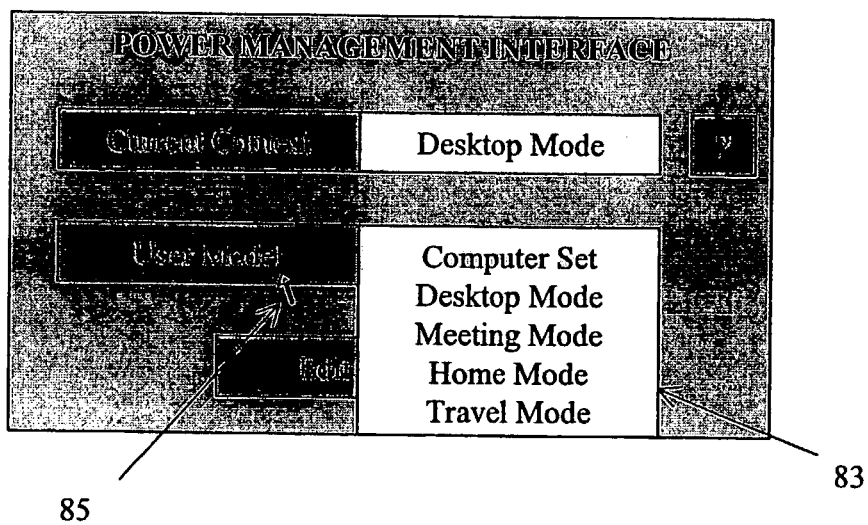

FIGS. 8a and 8b shows a possible user interface for the power management process. As indicated above, the power management process can operate entirely without user intervention after an initial setup phase (in which the user identifies to the computer key data, such as normal LAN settings and home, office and other key locations), but it is desirable for the user to override the process-determined settings if necessary. The user interface has a display box 81 indicating the current user context—query box 84 beside the display box 81 if clicked with the mouse shows the power management functions for the current mode, and can also be used to show power management functions for other modes. User model button 82, if activated by mouse 85, operates menu 83 allowing the user to set the power management mode—this can be "Computer Set", in which case power is managed according to the process described above, or it can be set by the user to one of the modes indicated (or perhaps to other modes—it may be advantageous to have specific power management settings that can only be activated by the user and which are not available for selection by the power management process). A further possibility is for there to be an "Edit Mode" button which allows the user to modify power management behaviour for existing context modes, or which allows the user to create new power management modes. For these additional power management modes to be available to the computer mode setting process, rules for use of these modes must be defined, together with the details of power management in each mode.

Change of power management behaviours will now be described with respect to different functions of the notebook computer, The power management behaviour will, in general, involve a list of selections from available options for power-hungry computer functions or components, where the list is appropriate to the context selected. Possibilities for different computer functions and components are discussed below.

BUTTON FUNCTIONS

Power management switches 19 (on a typical notebook computer, these are the main "power" button and the lid switch operated on closure of the notebook) can generally be given different functionalities through the API for the operating system. For example, activation of the lid switch will typically put the notebook computer into a "suspend" state which is power efficient, yet not especially responsive on reactivation. In Microsoft operating systems, there are typically a variety of suspend states available, ranging from inefficient yet responsive to power efficient but with a significant reactivation time. "Desktop" and "Meeting" contexts (especially "Meeting") may thus have both switches set to trigger an inefficient but responsive suspend state when activated (allowing the notebook to be brought to life instantly if needed—for example, the lid switch may merely switch off the screen) whereas "Home" and especially "Travel" may have a much more efficient suspend state set.

ANIMATION

Window animations can be disabled through APIs for Microsoft operating systems. In themselves, these animations (sliding and fading menus, animation of icons) consume little power, but this use can mount up when windows are used heavily. Animations could for example be disabled in "Travel" mode.

WINDOW DRAG

Moving a full window around a desktop screen has non-trivial cost—not only is there cost associated with the window itself, but there is also a burden in repainting applications underneath the window, and also in calculation of window layouts. Dragging outlines reduces these costs considerably. Again, this is an option which might be disabled in "Travel" mode, but not otherwise.

SCREEN POWER

The time taken for the screen to switch off if the computer is unused can be varied, and can be set separately for each context mode. Power savings are very significant, but the impact on the user is also significant, so this may be an area where it is desirable to allow user customisation for each context mode.

BACKLIGHTING

Where the backlight can be controlled by software (for example, in the HP Jornada 820), it can be dimmed while the system is idling. Interaction with BIOS is typically required to control backlighting. Application to contexts might be to enable backlight dimming for all modes except "Meeting".

SCREEN SAVERS

Screen savers are a major consumer of CPU time on most PCs. It is straightforward to set different screen savers for different modes, with a particularly efficient screen saver (or simply a blank screen) for the most power critical mode, "Travel".

HARD DISK

Hard disk spin down times can be altered both for power and for performance. Power management options for hard disks in Microsoft operating systems are defined (by Microsoft's ATAPI4), but are left to the manufacturer for implementation—IBM, for example, use a disk "throttle" allowing the user to establish a power/performance balance (described in U.S. Pat. No. 5,682,273)—and can be modified by appropriate ATAPI4 power management commands. Self-throttling behaviour of this type can be seen in other components (network cards, even parts of the core processor) with this self-throttling similarly being controllable by power management according to aspects of the present invention (the mode can determine whether or not the self-throttling behaviour is used, and how aggressively it operates). Again, "Travel" mode will be adapted to favour power management, and "Meeting" to favour performance.

LOW BATTERY

Different contexts may adopt different approaches to battery charge levels falling below a certain point (the point itself perhaps differing from mode to mode). In "Travel" mode this may lead to more drastic power savings, and in "Home" it may lead to transition to the "Travel" state, whereas in "Desktop" the power savings may be less severe and in "Meeting" the level may be set to a very low charge level and may drop immediately to a very severe power saving state (the notebook computer has optimal performance until no longer viable).

APPLICATIONS

Many applications contain options that could be switched off to achieve a considerable power saving. For example, disabling of animated help assistants and of automatic spelling and grammar correction in productivity software can reduce CPU power considerably. For Microsoft Office applications, it is possible (for Office 97 and Office 2K) to control the applications from other applications by the Automation facility, allowing for direct toggling of modes in different economy states. An alternative and more generally applicable approach is to write add-ins for each such application, such as small COM libraries which turn features on and off in accordance with the operating mode. For example, the "Travel" mode could have help assist animation and automatic spelling and grammar correction disabled—as might the "Meeting" mode, as these features are less likely to be needed in a meeting context—whereas the "Desktop" mode could have full functionality enabled. The use of a power management application to control the power consumption of other applications is discussed further in the applicant's copending patent application of even date entitled "Power Saving in Computing Applications", which is incorporated by reference herein.

For each context mode, the result will be a set of choices which in aspects of the present invention will be implemented by the power control application by the means indicated above—in most cases by appropriate API commands. An example of such a list is provided below in Table 2 for "Travel" mode.

TABLE 2

Power management options for "Travel" mode

| Function | Choice | User variable? |
|---|---|---|
| Start button | Deep suspend | Yes |
| Lid button | Medium suspend | Yes |
| Window animation | Disable | No |
| Window drag | Outline only | No |
| Screen power | Power off after 3 minute idle | Yes |
| Backlight | Maximum saving | No |
| Screen Saver | Low power | Yes |
| Hard Disk | High power/performance factor; power off after 3 minute idle | Yes |
| Low Power | 30% threshold; disable all non-critical application features (productivity suite), blank screen saver (screen saver), override all user variations from "Travel" default | No |
| Productivity Suite | Disable animated assistants, automatic grammar and spelling checker | Yes |

In the Table 2 option list, certain options are indicated as "user variable" and others are not—this affects whether the user can modify the mode with "Edit Mode" button 86. In step 75 of the process shown in FIG. 6, if it has been determined that the "Travel" state was to be entered, the power management process would change the functions and processes identified in the first column of Table 2 in accordance with the choices indicated in the second column.

In using aspects of the invention, the power management of a notebook computer or any other mobile computing apparatus can be managed without the need for user intervention in such a way as to optimise power management while maintaining levels of performance required by the user in different working contexts. One of ordinary skill in the art will appreciate that the present invention is not limited to notebook computers, but is also applicable to any portable or mobile computing apparatus. The skilled person will also appreciate that the context modes indicated in this application are exemplary, rather than limiting—it is advantageous to allow user modification of context rules (for example, a user may wish to set "Meeting" functionality for identified customer locations), user modification of power management for context modes, and even user creation of new context modes and associated rules.

It will be appreciated that determination of context can be used for more purposes than efficient power management. Other settings may also be determined for different contexts. One of the most useful will be default printer setting, and another is proxy server setting. Customisation for context beyond this is entirely possible—a further possibility is customisation of the user's desktop according to context (with shortcuts to selected presentations appearing in a special "Presentation" context desktop, for example). All that is required is for the power management application to be able to change the relevant configuration or application in response to sensed context.

The invention claimed is:

1. A portable computing device comprising a processor and an internal power source capable of powering all components of the portable computing device, the portable computing device also being adapted to be powered by an external power source, the portable computing device being capable of operating in a plurality of different operational contexts each with a set of device operation settings appropriate to that operational context, at least some of the different operational contexts being associated with performing device operation choices for the portable computing device, the processor being arranged
    (a) to determine a present operational context of the computing device defined by:
        (i) whether the device is being powered by the internal or external power source, and
        (ii) at least one other operational factor not related to (i), and
    (b) to control the power consumed by the device in response to the determined present operational context.

2. A computing device as claimed in claim 1, wherein the at least one other factor adapted to be used by the processor to determine the present operational context is present location of the computing device.

3. A computing device as claimed in claim 2, wherein the computing device comprises Global Positioning System apparatus to provide the present location information.

4. A computing device as claimed in claim 2, wherein the computing device comprises wireless telephony apparatus to provide the present location information.

5. A computing device as claimed in claim 2, wherein at least one operational context requires power conservation.

6. A computing device as claimed in claim 1, wherein the at least one other factor adapted to be used by the processor to determine the present operational context is a current network address of the computing device.

7. A computing device as claimed in claim 1, wherein the at least one other factor adapted to be used by the processor to determine the present operational context is information supplied by one or more devices over a network to the computing device.

8. A computing device as claimed in claim 1, wherein the at least one other factor adapted to be used by the processor to determine the present operational context is the active power source.

9. A computing device as claimed in claim 1, wherein said internal power sources includes a battery, and the at least one other factor adapted to be used by the processor to determine the present operational context is the charge state of the battery.

10. A computing device as claimed in claim 1, wherein the at least one other factor adapted to be used by the processor to determine the present operational context is a model of user behaviour based upon prior usage of the computing device.

11. A computing device as claimed in claim 1, wherein the computing device comprises buttons adapted to change the power status of the computing device, and wherein the processor is adapted to change the functionality of these buttons with change in present operational context.

12. A computing device as claimed in claim 1, wherein the computing device is adapted such that a user can override the processor determination of present operational context.

13. A computing device as claimed in claim 1, wherein the computing device is adapted such that the user can define a new operational context and rules to determine when the new operational context is the present operational context.

14. A computing device as claimed in claim 1, wherein the computing device is adapted such that the user can modify the operational contexts of the device or the rules for determination of an existing operational context.

15. A computing device as claimed in claim 1, wherein no operational context is defined solely by the presence or absence of a resource available to the computing device.

16. A computing device as claimed in claim 1, wherein the computing device is a notebook computer.

17. A computing device as claimed in claim 1, wherein the computing device is a personal digital assistant.

18. The device of claim 1, wherein the one other operational context includes operating the computing device:
   (a) as a desktop device;
   (b) at a meeting; and
   (c) while traveling.

19. The device of claim 1, wherein the one other operational context includes a meeting at which the portable computing device is located, a normal operating location of the portable computing device, and a location of the portable computing device remote from the normal operating location and the meeting.

20. The device of claim 19, wherein the location of the portable computing device remote from the normal operating location and the meeting includes the residence of the user and travel of the user.

21. The device of claim 19, wherein the location of the portable computing device remote from the normal operating location and the meeting includes the residence of the user.

22. The device of claim 19, wherein the location of the portable computing device remote from the normal operating location and the meeting includes travel of the user.

23. A portable computing device comprising a processor and one or more power sources, the device being capable of operating in a plurality of different contexts each with a set of device operation settings appropriate to that context, at least some of the different contexts being associated with performing device operation choices, wherein the processor is adapted to determine a present context of the computing device is defined by the nature or state of the active power source and at least one other factor not related to the nature or state of the active power source and is further adapted to control the operation of the device in response to the determined present context, the computing device including one or more applications, and the processor being arranged to enable or disable features of these installed applications in response to a change in present operational context.

24. A portable computing device comprising a processor and one or more power sources, the device being capable of operating in a plurality of different contexts each with a set of device operation settings appropriate to that context, at least some of the different contexts being associated with performing device operation choices, wherein the processor is adapted to determine a present context of the computing device is defined by the nature or state of the active power source and at least one other factor not related to the nature or state of the active power source and is further adapted to control the operation of the device in response to the determined present context, one or more of the device operation settings relating to a preferred configuration of the computing device for the present context.

25. A computing device as claimed in claim 24, wherein one of the device operation settings relates to a default printer for the computing device.

26. A computing device as claimed in claim 24, wherein one of the device operation settings relates to a proxy server for the computing device.

27. A computing device as claimed in claim 24, wherein one of the device operation settings relates to a desktop of the computing device.

28. A computer readable medium or memory having recorded thereon a data structure readable by a mobile computing device including a processor and an internal power source capable of powering all components of the portable computing device, the portable computing device also being adapted to be powered by an external power source, the portable computing device being capable of operating in a plurality of different operational contexts, each with a set of device operation settings appropriate to that operational context, at least some of the different operational contexts being associated with performing operation choices for the portable computing device, the data structure comprising:

a definition of the plurality of different operational contexts of the computing device, each operational context being defined with a set of device operation settings appropriate to that operational context, the different operational contexts being associated with performing device operation choices;

executable code comprising a process for determining a present operational context defined by:

(i) whether the portable computing device is being powered by the internal or external power source; and (ii) at least one of the operational context not related to (i); and executable code comprising a process for controlling the power consumed by the device in response to the determined present operational context.

29. A computer readable medium or memory as claimed in claim 28, wherein at least one of said device operation settings is a device configuration setting.

30. A computer readable medium or memory as claimed in claim 28, wherein one of said operational contexts is derived in response to the apparatus for detecting the present location of the mobile computing device.

31. A computer readable medium or memory as claimed in claim 28, arranged to allow user creation of an additional operational context with a set of device operation choices and rules for determining when the additional operational context is the present operational context.

32. A computer readable medium or memory as claimed in claim 28, arranged to allow user modification of the operational contexts of the device for an existing operational context.

33. A computer readable medium or memory as claimed in claim 28, arranged to allow a user to override the determination of present operational context.

34. The medium or memory of claim 28, wherein the one other operational context includes operating the computing device:
(a) as a desktop device;
(b) at a meeting; and
(c) while traveling.

35. The medium or memory of claim 28, wherein the one other operational context includes a meeting at which the portable computing device is located, a normal operating location of the portable computing device, and a location of the portable computing device remote from the normal operating location and the meeting.

36. The medium or memory of claim 35, wherein the location of the portable computing device and a location of the portable computing device remote from the normal operating location and the meeting includes the residence of the user and travel of the user.

37. The medium or memory of claim 35, wherein the location of the portable computing device and a location of the portable computing device remote from the normal operating location and the meeting includes the residence of the user.

38. The medium or memory of claim 35, wherein the location of the portable computing device and a location of the portable computing device remote from the normal operating location and the meeting includes the residence of the user and travel of the user.

39. A method of power management in a portable computing device having one or more selectively useable resources and able to be held by one hand of a user, the method being performed by using a plurality of operational contexts of the computing device, each operational context being defined with a set of device operation choices for power management appropriate to that operational context, the different operational contexts being associated with performing device operation choices; the method comprising:
determining a present operational context of the computing device, the present operational context being determined by (a) whether a specific one of the one or more selectable resources in use, and (b) at least one other factor not related to the nature or state of an active power source for the portable computing device; and
controlling the consumption of power by the device in response to the determined present operational context.

40. A method as claimed in claim 39, wherein the step of determining the present operational context comprises polling one or more sources providing direct or indirect power management requirement information for the computing device.

41. A method as claimed in claim 40, wherein one factor in determining present operational context includes detecting the present location of the computing device.

42. A method as claimed in claim 41, wherein one operational context is adapted for power conservation.

43. A method as claimed in claim 40, wherein one factor in determining present operational context includes a model of user behaviour based upon prior usage of the computing device.

44. A method as claimed in claim 40, wherein the at least one other factor used in determining the present operational context is a current network address of the computing device.

45. A method as claimed in claim 40, wherein the at least one other factor used in determining the present operational context is the type of active power source for the computing device.

46. A method as claimed in claim 40, wherein one of said power sources is a battery, and the at least one other factor used by the processor to determine the present operational context is a charge of the battery.

47. A method as claimed in claim 39, wherein the computing device has one or more installed applications, and wherein implementation of device operation choices for the present operational context comprises enabling or disabling features of these installed applications.

48. A method as claimed in claim 39, wherein the one or more selectively usable resources comprises an Internet network connection.

49. The method of claim 39, wherein the determined present operational context includes operating the computing device:
(a) as a desktop device;
(b) at a meeting; and
(c) while traveling.

50. The method of claim 39, wherein the determined present operational context includes a meeting at which the portable computing device is located, a normal operating location of the portable computing device, and a location of the portable computing device remote from the normal operating location and the meeting.

51. The method of claim 50, wherein the location of the portable computing device remote from the normal operating location and the meeting includes the residence of the user and travel of the user.

52. The method of claim 50, wherein the location of the portable computing device remote from the normal operating location and the meeting includes the residence of the user.

53. The method of claim 50, wherein the location of the portable computing device remote from the normal operating location and the meeting includes travel of the user.

54. A portable computing device that can easily be carried in one hand of a user, the computing device including: a battery power supply that can be charged by a mains supply while the portable computing device is in use, a processor, a display, a memory arrangement and input devices, the computing device being capable of being operated under different operational contexts and being arranged so the processor determines the present operational context in response to indications of (a) whether the battery is being charged by mains supply or by the battery supplying power to the processor, display and memory arrangement without being supplied with power by the mains supply, and (b) another operational context in which the computing device is operating at any particular time and that differs from (a), the processor being arranged to control the operation of the computing device in response to the determined present operational context.

55. The device of claim 54, wherein the another operational context includes operating the computing device:

(a) as a desktop device;

(b) at a meeting; and (c) while traveling.

56. The device of claim 54, wherein the controlled operation includes the amount of power supplied to the computing device.

* * * * *